(12) United States Patent
Kurebayashi et al.

(10) Patent No.: US 11,597,316 B2
(45) Date of Patent: Mar. 7, 2023

(54) VEHICLE DISPLAY SYSTEM AND VEHICLE

(71) Applicant: KOITO MANUFACTURING CO., LTD., Tokyo (JP)

(72) Inventors: Toshihiko Kurebayashi, Shizuoka (JP); Masaaki Nakabayashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/266,391

(22) PCT Filed: Aug. 2, 2019

(86) PCT No.: PCT/JP2019/030583
§ 371 (c)(1),
(2) Date: Feb. 5, 2021

(87) PCT Pub. No.: WO2020/031917
PCT Pub. Date: Feb. 13, 2020

(65) Prior Publication Data
US 2021/0309145 A1    Oct. 7, 2021

(30) Foreign Application Priority Data
Aug. 6, 2018    (JP) .............................. JP2018-147735

(51) Int. Cl.
*B60Q 1/50*    (2006.01)
*B60Q 1/34*    (2006.01)
(Continued)

(52) U.S. Cl.
CPC .............. *B60Q 1/50* (2013.01); *B60Q 1/346* (2013.01); *G06F 3/1431* (2013.01);
(Continued)

(58) Field of Classification Search
CPC ........ B60K 35/00; B60K 2370/31–334; B60K 2370/797; B60Q 1/346; B60Q 1/50–54;
(Continued)

(56) References Cited

U.S. PATENT DOCUMENTS

| 9,987,979 B2 * | 6/2018 | Kawamata ............. G08G 1/161 |
| 2017/0337821 A1 | 11/2017 | Masuda et al. |
| 2019/0051185 A1 | 2/2019 | Masuda et al. |

FOREIGN PATENT DOCUMENTS

| JP | H09277887 A | 10/1997 |
| JP | 2016049891 A | 4/2016 |
| JP | 2016055691 A | 4/2016 |

OTHER PUBLICATIONS

International Search Report issued in International Application No. PCT/JP2019/030583, dated Oct. 21, 2019 (1 page).
(Continued)

*Primary Examiner* — Jason M Han
(74) *Attorney, Agent, or Firm* — Osha Bergman Watanabe & Burton LLP

(57) ABSTRACT

A display system provided in a vehicle includes: a road surface drawing device configured to emit a light pattern toward a road surface outside the vehicle; and a display control unit configured to control the road surface drawing device. The display control unit stops emission of the light pattern in response to detection of a light pattern emitted from a vehicle.

8 Claims, 14 Drawing Sheets

(51) Int. Cl.
*G06F 3/14* (2006.01)
*F21Y 115/10* (2016.01)

(52) U.S. Cl.
CPC .... *B60Q 2300/45* (2013.01); *B60R 2300/205* (2013.01); *B60R 2300/301* (2013.01); *F21Y 2115/10* (2016.08)

(58) Field of Classification Search
CPC ............ B60Q 2300/45; B60Q 2400/50; B60R 2300/205; B60R 2300/301; F21Y 2115/10; G06F 3/1431
See application file for complete search history.

(56) References Cited

OTHER PUBLICATIONS

Written Opinion issued in International Application No. PCT/JP2019/030583, dated Oct. 21, 2019 (4 pages).

\* cited by examiner

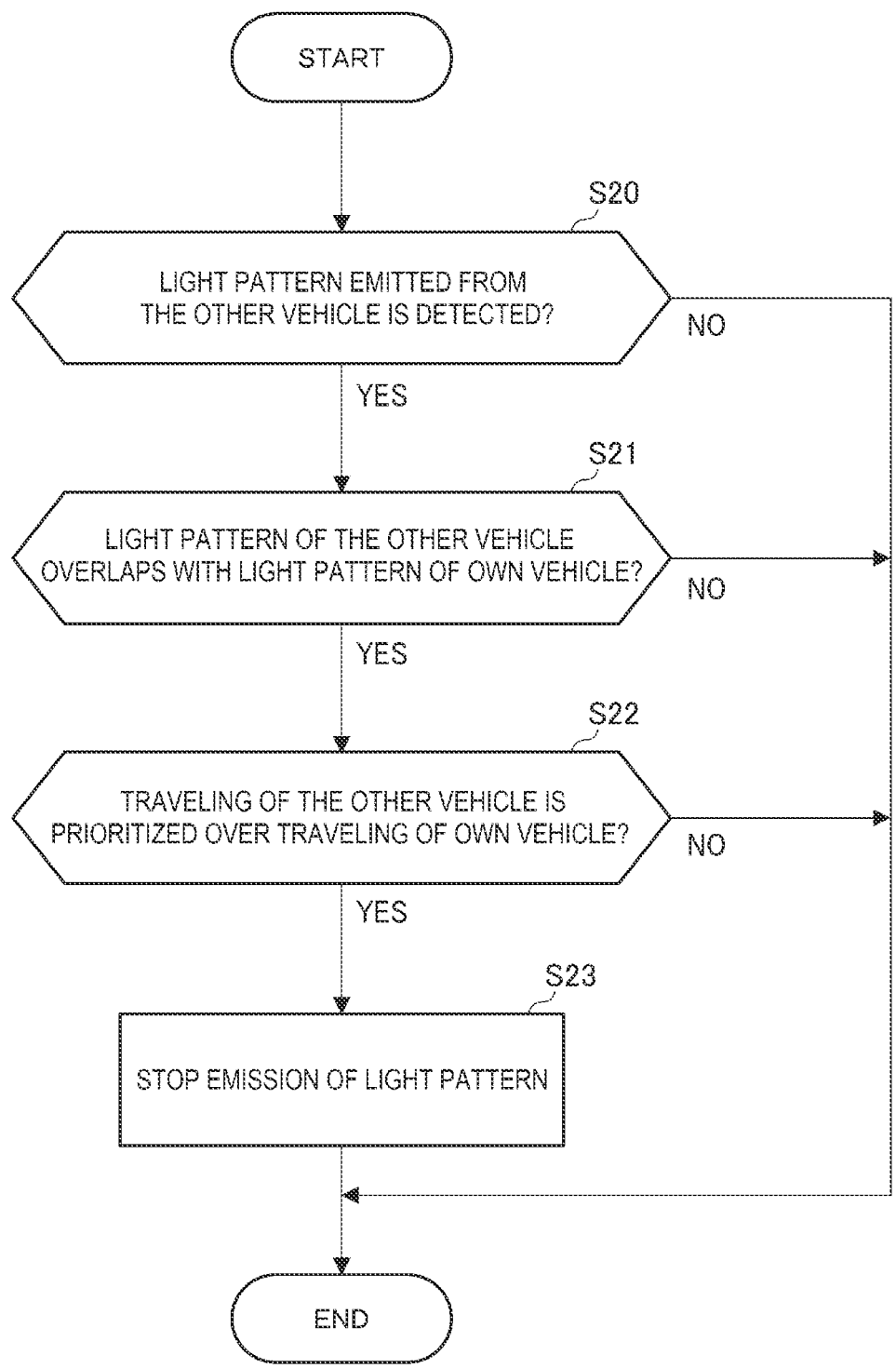

VEHICLE DISPLAY SYSTEM AND VEHICLE

TECHNICAL FIELD

The present disclosure relates to a vehicle display system and a vehicle including the vehicle display system.

BACKGROUND ART

Currently, research on an automated driving technology for an automobile is actively carried out in each country, and legislation for allowing a vehicle (Hereinafter, the "vehicle" refers to the automobile.) to travel on a public road in an automated driving mode is being studied in each country. Here, in the automated driving mode, a vehicle system automatically controls traveling of the vehicle. Specifically, in the automated driving mode, the vehicle system automatically performs at least one of steering control (control of a traveling direction of the vehicle), brake control and accelerator control (control of vehicle braking and acceleration/deceleration) based on information (surrounding environment information) indicating a surrounding environment of the vehicle obtained from a sensor such as a camera or a radar (for example, a laser radar or a millimeter wave radar). In contrast, in a manual driving mode described below, a driver controls the traveling of the vehicle, as is a case with many related-art vehicles. Specifically, in the manual driving mode, the traveling of the vehicle is controlled according to an operation of the driver (a steering operation, a brake operation and an accelerator operation), and the vehicle system does not automatically perform the steering control, the brake control and the accelerator control. A driving mode of the vehicle is not a concept existing only in some vehicles, but a concept existing in all vehicles including the related-art vehicles not having an automated driving function, and is classified according to, for example, a vehicle control method.

Therefore, the vehicle traveling in the automated driving mode (hereinafter, appropriately referred to as an "automated driving vehicle") and the vehicle traveling in the manual driving mode (hereinafter, appropriately referred to as a "manual driving vehicle") are expected to coexist on the public road in the future.

As an example of the automated driving technology, Patent Literature 1 discloses an automated following traveling system in which a following vehicle automatically follows a preceding vehicle. In the automated following traveling system, each of the preceding vehicle and the following vehicle includes a lighting system, and character information for preventing other vehicles from interrupting between the preceding vehicle and the following vehicle is displayed on the lighting system of the preceding vehicle, and character information indicating that the following vehicle automatically follows the preceding vehicle is displayed on the lighting system of the following vehicle.

CITATION LIST

Patent Literature

Patent Literature 1: JP-A-H9-277887

SUMMARY OF INVENTION

Technical Problem

In a future automated driving society, it is expected that visual communication between the automated driving vehicle and a person will become important. In particular, it is expected that visual communication between a vehicle and an object such as a pedestrian present outside the vehicle, and visual communication between the vehicle and an occupant of the vehicle become increasingly important. In this respect, it is possible to realize the visual communication between the vehicle and the object using a road surface drawing device that emits a light pattern onto a road surface, and it is possible to realize the visual communication between the vehicle and the occupant using a head-up display (HUD).

It is assumed that when a first vehicle emits a light pattern onto a road surface, a second vehicle emitting a light pattern onto a road surface is present around the first vehicle. In such a situation, when the light pattern of the first vehicle overlaps with the light pattern of the second vehicle, an occupant of the first vehicle, a pedestrian or the like may not clearly view the light pattern of the second vehicle. Alternatively, an occupant of the second vehicle, a pedestrian or the like may not clearly view the light pattern of the first vehicle. Therefore, the first vehicle may not sufficiently convey an intention thereof to outside of the first vehicle, and the second vehicle may not sufficiently convey an intention thereof to outside of the second vehicle. From the above viewpoint, there is room for further improvement in visual communication using the light pattern emitted onto the road surface.

An object of the present disclosure is to provide a vehicle display system and a vehicle capable of preventing a decrease in visibility to a light pattern emitted from the other vehicle in a situation in which two vehicles emitting light patterns onto a road surface are present close to each other.

Solution to Problem

A vehicle display system according to an aspect of the present disclosure provided in a vehicle includes: a first display device configured to emit a first light pattern toward a road surface outside the vehicle; and a display control unit configured to control the first display device.

In response to detection of a second light pattern emitted from the other vehicle present around the vehicle toward a road surface outside the other vehicle, the display control unit stops emission of at least a part of the first light pattern or changes a visual mode of the first light pattern.

According to the above configuration, in response to the detection of the second light pattern of the other vehicle present around the vehicle, the emission of at least a part of the first light pattern is stopped or the visual mode of the first light pattern is changed. In this way, it is possible to suitably prevent a situation in which an occupant of the own vehicle and/or a pedestrian or the like may not clearly view the second light pattern emitted onto the road surface. Therefore, it is possible to provide the vehicle display system capable of preventing a decrease in visibility to the second light pattern.

When the detected second light pattern is present within a predetermined distance from the vehicle or the first light pattern, the display control unit may stop the emission of at least a part of the first light pattern or change the visual mode of the first light pattern.

According to the above configuration, when the detected second light pattern is present within the predetermined distance from the vehicle or the first light pattern, the emission of at least a part of the first light pattern is stopped or the visual mode of the first light pattern is changed. In this way, it is possible to suitably prevent a situation in which an occupant of the own vehicle and/or a pedestrian or the like may not clearly view the second light pattern emitted onto the road surface. Therefore, it is possible to provide the vehicle display system capable of preventing a decrease in visibility to the second light pattern.

When the detected second light pattern overlaps with the first light pattern, the display control unit may stop the emission of at least a part of the first light pattern or change the visual mode of the first light pattern.

According to the above configuration, when the second light pattern overlaps with the first light pattern, the emission of at least a part of the first light pattern is stopped or the visual mode of the first light pattern is changed. In this way, it is possible to suitably prevent a situation in which an occupant of the own vehicle and/or a pedestrian or the like may not clearly view the second light pattern. Therefore, it is possible to provide the vehicle display system capable of preventing a decrease in visibility to the second light pattern.

When traveling of the other vehicle is prioritized over traveling of the vehicle, the display control unit may stop the emission of at least a part of the first light pattern or change the visual mode of the first light pattern.

According to the above configuration, in response to the detection of the second light pattern of the other vehicle present around the vehicle, the emission of at least a part of the first light pattern is stopped or the visual mode of the first light pattern is changed. In this way, it is possible to suitably prevent a situation in which an occupant of the own vehicle and/or a pedestrian or the like may not clearly view the second light pattern of the other vehicle whose traveling is prioritized over that of the own vehicle. Therefore, it is possible to provide the vehicle display system capable of preventing a decrease in visibility to the second light pattern.

The vehicle display system may further include: a second display device located inside the vehicle and configured to display predetermined information toward an occupant of the vehicle such that the predetermined information is superimposed on a real space outside the vehicle.

The display control unit, in response to the detection of the second light pattern, may stop the emission of at least a part of the first light pattern and cause the second display device to display information indicated by at least a part of the first light pattern.

According to the above configuration, in response to the detection of the second light pattern of the other vehicle present around the vehicle, the emission of at least a part of the first light pattern is stopped and the information indicated by at least a part of the first light pattern is displayed by the second display device. Therefore, it is possible to suitably prevent a situation in which an occupant of the own vehicle and/or a pedestrian or the like may not clearly view the second light pattern. The occupant of the own vehicle can grasp an intention of the own vehicle by viewing the information displayed on the second display device.

The vehicle display system may further include: a second display device located inside the vehicle and configured to display predetermined information toward an occupant of the vehicle such that the predetermined information is superimposed on a real space outside the vehicle.

The display control unit, in response to the detection of the second light pattern, may stop emission of the first light pattern indicating character information and causes the second display device to display the character information indicated by the first light pattern.

According to the above configuration, in response to the detection of the second light pattern of the other vehicle present around the vehicle, the emission of the first light pattern indicating the character information is stopped and the character information indicated by the first light pattern is displayed by the second display device. Therefore, it is possible to suitably prevent a situation in which an occupant of the own vehicle and/or a pedestrian or the like may not clearly view the second light pattern. The occupant of the own vehicle can grasp an intention of the own vehicle by viewing the character information displayed on the second display device.

A vehicle including the vehicle lighting display system is also provided.

According to the above, it is possible to provide a vehicle capable of preventing a decrease in visibility to a light pattern emitted from the other vehicle in a situation in which two vehicles emitting light patterns onto a road surface are present close to each other.

Advantageous Effects of Invention

According to the present disclosure, it is possible to provide a vehicle display system and a vehicle capable of preventing a decrease in visibility to a light pattern emitted from the other vehicle when two vehicles emitting light patterns onto a road surface are present close to each other.

BRIEF DESCRIPTION OF DRAWINGS

FIG. 14 is a flowchart for explaining a third operation example of the display system according to the present embodiment.

DESCRIPTION OF EMBODIMENTS

Figure 1:
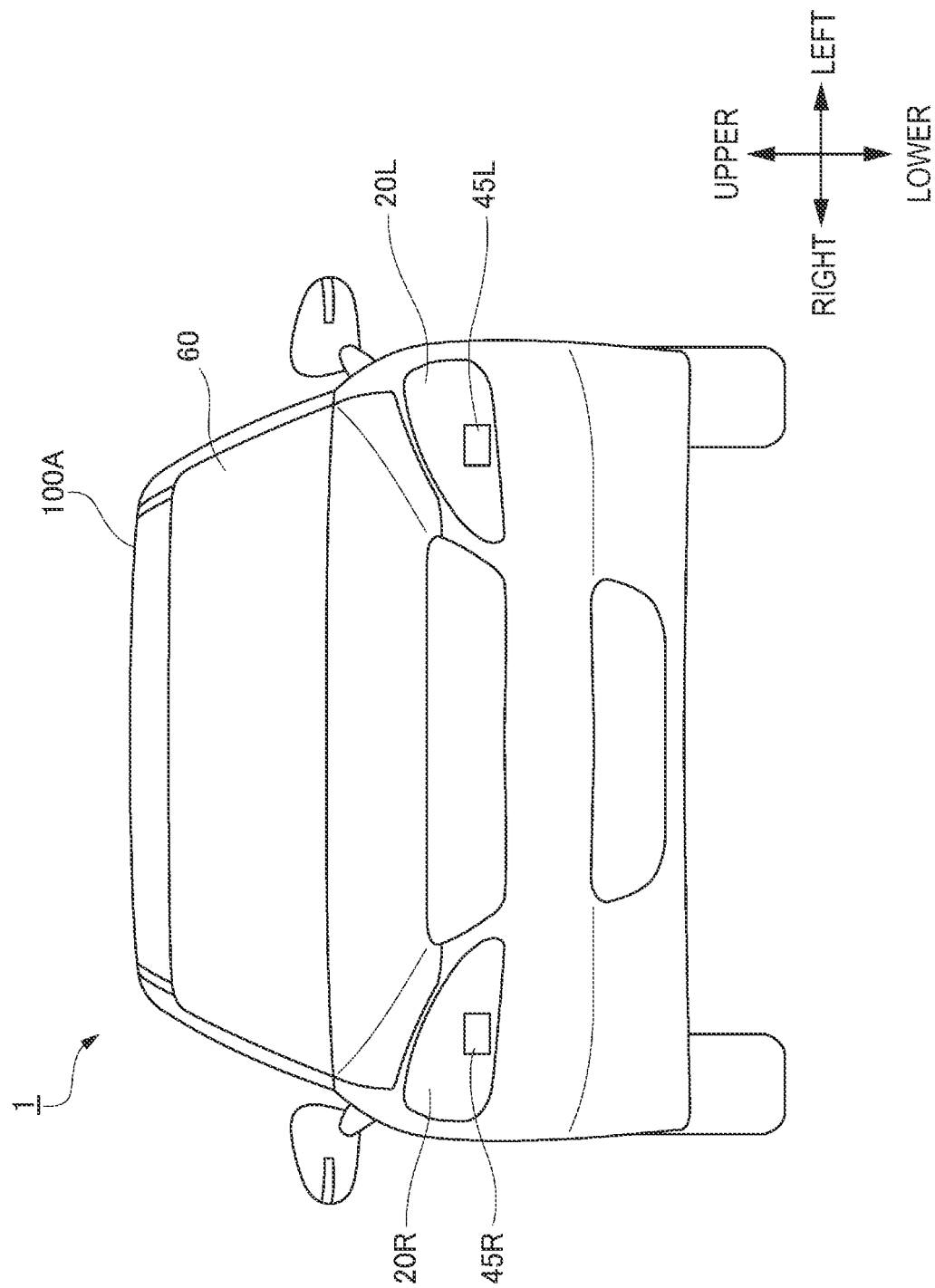
FIG. 1 is a front view of a vehicle equipped with a vehicle system according to an embodiment of the present invention (hereinafter, simply referred to as the present embodiment).

Hereinafter, an embodiment of the present invention (hereinafter, referred to as the present embodiment) will be described with reference to the drawings. Dimensions of members shown in the drawings may be different from actual dimensions of the members for convenience of description.

In description of the present embodiment, a "left-right direction", an "upper-lower direction" and a "front-rear direction" may be appropriately referred to, for convenience of description. These directions are relative directions set for a vehicle 1 shown in FIG. 1. Here, the "left-right direction" is a direction including a "left direction" and a "right direction". The "upper-lower direction" is a direction including an "upper direction" and a "lower direction". The "front-rear direction" is a direction including a "front direction" and a "rear direction". Although not shown in FIG. 1, the front-rear direction is the direction orthogonal to the left-right direction and the upper-lower direction.

Figure 2:
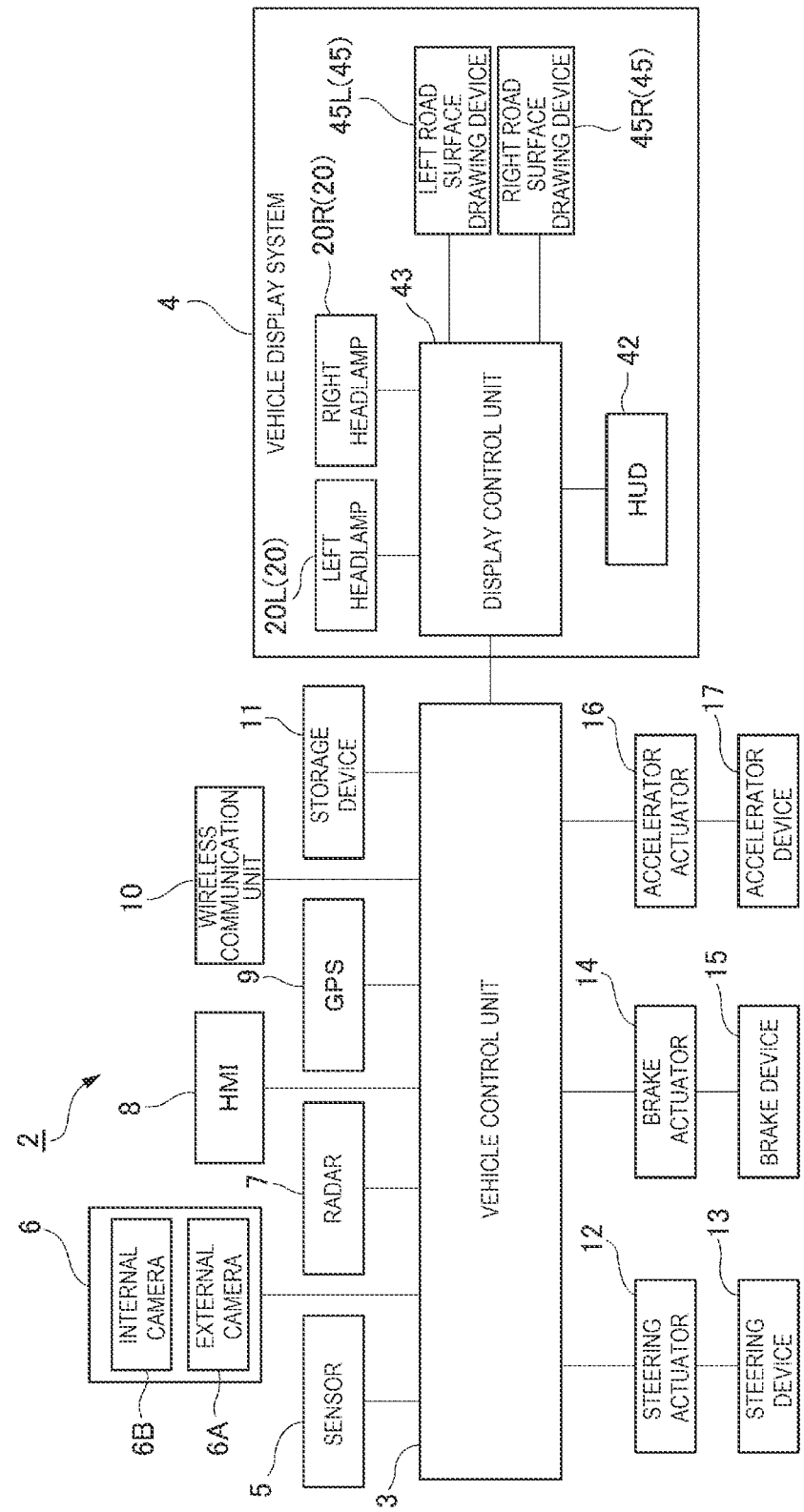
FIG. 2 is a block diagram of the vehicle system according to the present embodiment.

First, a vehicle system 2 according to the present embodiment will be described with reference to FIGS. 1 and 2. FIG. 1 is a front view of the vehicle 1 equipped with the vehicle system 2. FIG. 2 is a block diagram of the vehicle system 2. The vehicle 1 is a vehicle (an automobile) capable of traveling in an automated driving mode.

As shown in FIG. 2, the vehicle system 2 includes a vehicle control unit 3, a vehicle display system 4 (hereinafter, simply referred to as a "display system 4"), a sensor 5, a camera 6 and a radar 7. The vehicle system 2 further includes a human machine interface (HMI) 8, a global positioning system (GPS) 9, a wireless communication unit 10, a storage device 11, a steering actuator 12, a steering device 13, a brake actuator 14, a brake device 15, an accelerator actuator 16 and an accelerator device 17.

The vehicle control unit 3 is configured to control traveling of the vehicle 1. The vehicle control unit 3, for example, includes at least one electronic control unit (ECU). The electronic control unit includes a computer system (for example, a system on a chip (SoC)) including one or more processors and one or more memories, and an electronic circuit including an active element such as a transistor and a passive element. The processor includes, for example, at least one of a central processing unit (CPU), a micro processing unit (MPU), a graphics processing unit (GPU) and a tensor processing unit (TPU). The CPU may include a plurality of CPU cores. The GPU may include a plurality of GPU cores. The memory includes a read only memory (ROM) and a random access memory (RAM). The ROM may store a vehicle control program. For example, the vehicle control program may include an artificial intelligence (AI) program for automated driving. The AI program is a program (a trained model) constructed by supervised or unsupervised machine learning (particularly, deep learning) using a multilayer neural network. The RAM may temporarily store a vehicle control program, vehicle control data and/or surrounding environment information indicating a surrounding environment of the vehicle. The processor may be configured to develop a program designated from various vehicle control programs stored in the ROM on the RAM and execute various types of processing in cooperation with the RAM. The computer system may include a non-Neumann type computer such as an application specific integrated circuit (ASIC) or a field-programmable gate array (FPGA). Further, the computer system may include a combination of a Neumann type computer and a non-Neumann type computer.

The display system 4 includes a left headlamp 20L, a right headlamp 20R, a left road surface drawing device 45L and a right road surface drawing device 45R. The display system 4 further includes a head-up display (HUD) 42 and a display control unit 43.

As shown in FIG. 1, the left headlamp 20L is disposed on a left front surface of the vehicle 1, and includes a low beam lamp configured to irradiate ahead of the vehicle 1 with a low beam, and a high beam lamp configured to irradiate ahead of the vehicle 1 with a high beam. The right headlamp 20R is disposed on a right front surface of the vehicle 1, and includes a low beam lamp configured to irradiate ahead of the vehicle 1 with a low beam, and a high beam lamp configured to irradiate ahead of the vehicle 1 with a high beam. Each of the low beam lamp and the high beam lamp includes one or more light emitting elements such as light emitting diodes (LED) or laser diodes (LD), and an optical member such as a lens and a reflector. Hereinafter, the left head lamp 20L and the right headlamp 20R may be collectively referred to simply as the headlamp 20 for convenience of description.

The left road surface drawing device 45L (an example of a first display device) is disposed in a lamp chamber of the left headlamp 20L. The left road surface drawing device 45L is configured to emit a light pattern toward a road surface outside the vehicle 1. The left road surface drawing device 45L includes, for example, a light source unit, a drive mirror, an optical system such as a lens and a mirror, a light source drive circuit, and a mirror drive circuit. The light source unit is a laser light source or an LED light source. For example, the laser light source is RGB laser light sources configured to respectively emit red laser light, green laser light and blue laser light. The drive mirror is, for example, a micro electro mechanical systems (MEMS) mirror, a digital mirror device (DMD), a galvanometer mirror, a polygon mirror or the like. The light source drive circuit is configured to control driving of the light source unit. The light source drive circuit is configured to generate a control signal for controlling an operation of the light source unit based on a signal related to a predetermined light pattern transmitted from the display control unit 43, and then transmit the generated control signal to the light source unit. The mirror drive circuit is configured to control driving of the drive mirror. The mirror drive circuit is configured to generate a control signal for controlling an operation of the drive mirror based on a signal related to a predetermined light pattern transmitted from the display control unit 43, and then transmit the generated control signal to the drive mirror. When the light source unit is the RGB laser light sources, the left road surface drawing device 45L may draw light patterns of various colors on the road surface by performing scanning with laser light.

The right road surface drawing device 45R (an example of the first display device) is disposed in a lamp chamber of the right headlamp 20R. The right road surface drawing device 45R is configured to emit a light pattern toward the road surface outside the vehicle 1. Similarly to the left road surface drawing device 45L, the right road surface drawing device 45R includes a light source unit, a drive mirror, an optical system such as a lens, a light source drive circuit, and a mirror drive circuit.

A drawing method of the left road surface drawing device 45L and the right road surface drawing device 45R may be a raster scan method, a digital light processing (DLP) method or a liquid crystal on silicon (LCOS) method. When the DLP method or the LCOS method is adopted, the light source unit may be the LED light source. A projection method may be adopted as a drawing method of the left road surface drawing device 45L and the right road surface drawing device 45R. When the projection method is adopted, the light source unit may be a plurality of LED light sources arranged in a matrix. In the present embodiment, the left road surface drawing device 45L and the right road surface drawing device 45R may be disposed on a vehicle body roof 100A. In this respect, one road surface drawing device may be disposed on the vehicle body roof 100A. Hereinafter, for convenience of description, the left road surface drawing device 45L and the right road surface drawing device 45R may be collectively referred to simply as the road surface drawing device 45. In the following description, the road surface drawing device 45 indicates the left road surface drawing device 45L, the right road surface drawing device 45R, or a combination of the left road surface drawing device 45L and the right road surface drawing device 45R.

Figure 3:
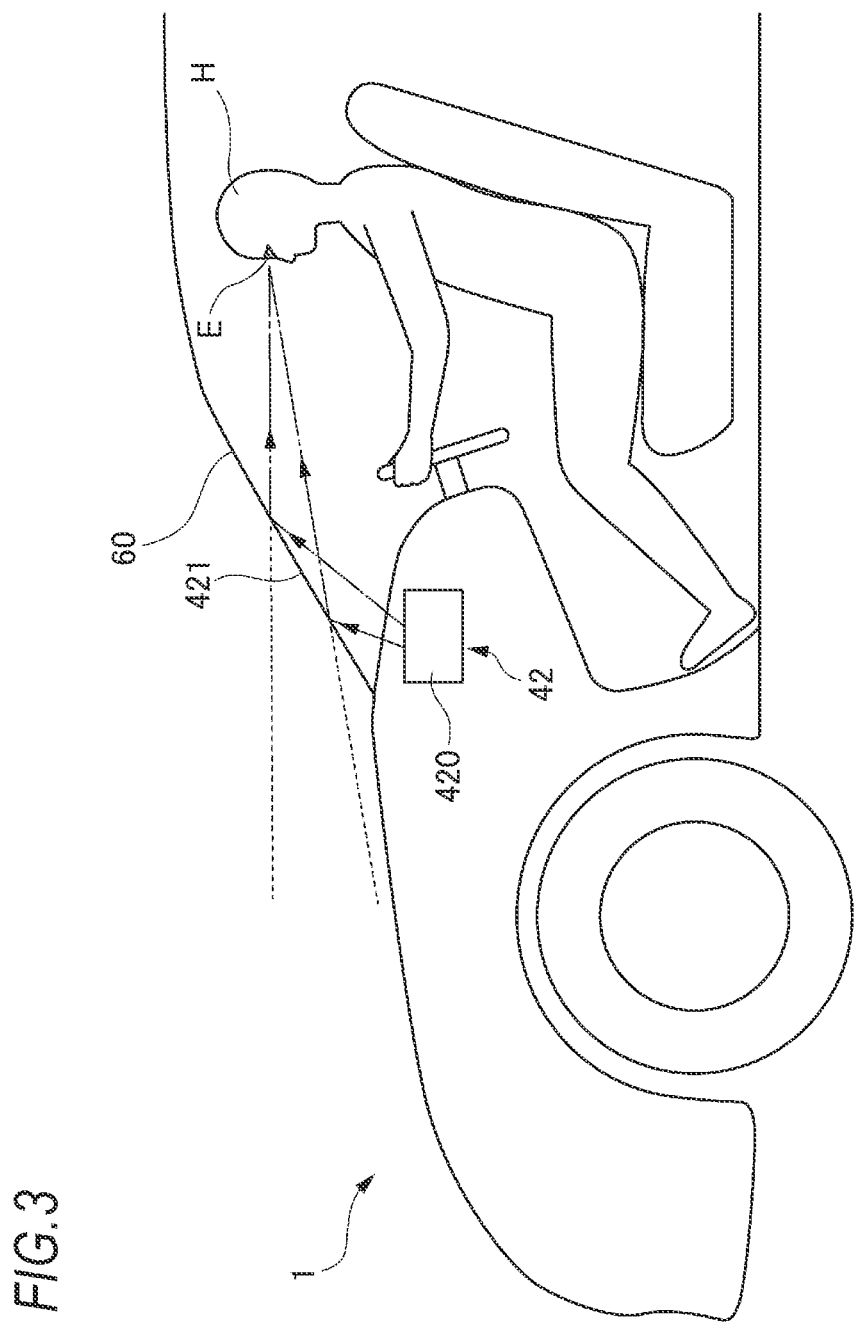
FIG. 3 is a view showing a state in which light emitted from a head-up display (HUD) reaches eyes of an occupant.

The HUD 42 (an example of a second display device) is located inside the vehicle 1. Specifically, the HUD 42 is installed at a predetermined position inside the vehicle 1. For example, as shown in FIG. 3, the HUD 42 may be disposed in a dashboard of the vehicle 1. The HUD 42 functions as a visual interface between the vehicle 1 and an occupant H. The HUD 42 is configured to display predetermined information (hereinafter, referred to as HUD information) toward the occupant H such that the HUD information is superimposed on a real space outside the vehicle 1 (particularly, the surrounding environment ahead of the vehicle 1). In this way, the HUD 42 functions as an augmented reality (AR) display. The HUD information displayed by the HUD 42 is, for example, vehicle traveling information on the traveling of the vehicle 1 and/or the surrounding environment information on the surrounding environment of the vehicle 1 (particularly, information related to an object present outside the vehicle 1).

As shown in FIG. 3, the HUD 42 includes an HUD main body 420 and a transparent screen 421. The HUD main body 420 includes a light source unit, a drive mirror, an optical system, a light source drive circuit and a mirror drive circuit. The light source unit is, for example, a laser light source or an LED light source. The laser light source is, for example, RGB laser light sources configured to respectively emit red laser light, green laser light and blue laser light. The drive mirror is, for example, a MEMS mirror, a DMD, a galvanometer mirror, a polygon mirror or the like. The optical system includes at least one of a prism, a lens, a diffusion plate and a magnifying glass. The light source drive circuit is configured to control driving of the light source unit. The light source drive circuit is configured to generate a control signal for controlling an operation of the light source unit based on image data transmitted from the display control unit 43, and then transmit the generated control signal to the light source unit. The mirror drive circuit is configured to control driving of the drive mirror. The mirror drive circuit is configured to generate a control signal for controlling an operation of the drive mirror based on image data transmitted from the display control unit 43, and then transmit the generated control signal to the drive mirror.

The transparent screen 421 includes a part of a front window 60. The transparent screen 421 has a HUD display area D1 where the HUD information may be displayed (see FIG. 10). Light (an image) emitted from the HUD main body 420 is radiated to the HUD display area D1 of the transparent screen 421. Next, the HUD display area D1 reflects the light emitted from the HUD main body 420 toward a viewpoint E of the occupant H. As a result, the occupant H recognizes the light (the image) emitted from the HUD main body 420 as a virtual image formed at a predetermined position ahead of the transparent screen 421. In this way, as a result of the HUD information (the image) displayed by the HUD 42 being superimposed on the real space ahead of the vehicle 1, the occupant E can feel that the HUD information is floating on a road.

The transparent screen 421 may be configured as a transparent combiner separated from the front window 60. Even in this case, the combiner has the HUD display area. Further, the occupant H recognizes the light (the image) emitted from the HUD main body 420 as the virtual image formed at a predetermined position ahead of the combiner. The position where the virtual image is formed (a virtual image formation position) may be changed by adjusting a position of the optical system of the HUD 42 (particularly, a focal length of a projection optical system). In this respect, the display control unit 43 may control the HUD 42 such that a position of an object present ahead of the vehicle 1 and the virtual image formation position substantially coincide with each other based on position information of the object. A drawing method of the HUD 42 may be a raster scan method, a DLP method or an LCOS method. When the DLP method or the LCOS method is adopted, the light source unit of the HUD 42 may be an LED light source.

The display control unit 43 is configured to control operations of the road surface drawing device 45 (specifically, the left road surface drawing device 45L and the right road surface drawing device 45R), the headlamp 20 (specifically, the left headlamp 20L and the right headlamp 20R), and the HUD 42. In this respect, the display control unit 43 is configured to control the operation of the road surface drawing device 45 (specifically, the left road surface drawing device 45L and the right road surface drawing device 45R) such that the light pattern is radiated to a predetermined position on the road surface. The display control unit 43 is configured to control the operation of the HUD 42 such that the HUD information is displayed in the HUD display area D1.

The display control unit 43 includes an electronic control unit (ECU). The electronic control unit includes a computer system (for example, a SoC) including one or more processors and one or more memories, and an electronic circuit including an active element such as a transistor and a passive element. The processor includes at least one of a CPU, an MPU, a GPU and a TPU. The memory includes a ROM and a RAM. The computer system may include a non-Neumann type computer such as an ASIC or an FPGA.

In the present embodiment, the vehicle control unit 3 and the display control unit 43 are provided as separate components, but the vehicle control unit 3 and the display control unit 43 may be integrally configured. In this respect, the display control unit 43 and the vehicle control unit 3 may be formed of a single electronic control unit. The display control unit 43 may include two electronic control units: an electronic control unit configured to control the operations of the headlamp 20 and the road surface drawing device 45, and an electronic control unit configured to control the operation of the HUD42.

The sensor 5 includes at least one of an acceleration sensor, a speed sensor and a gyro sensor. The sensor 5 is configured to detect a traveling state of the vehicle 1 and output traveling state information to the vehicle control unit 3. The sensor 5 may further include a seating sensor that detects whether a driver is seated in a driver seat, a face orientation sensor that detects a direction of a face of the driver, an external weather sensor that detects an external weather condition, a human sensor that detects whether there is a person in the vehicle, or the like.

The camera 6 is, for example, a camera including an imaging element such as a charge-coupled device (CCD) or a complementary MOS (CMOS). The camera 6 includes one or more external cameras 6A and an internal camera 6B. The external camera 6A is configured to acquire image data indicating the surrounding environment of the vehicle 1 and then transmit the image data to the vehicle control unit 3. The vehicle control unit 3 acquires the surrounding environment information based on the transmitted image data. Here, the surrounding environment information may include information on the object (a pedestrian, other vehicles, a sign or the like) present outside the vehicle 1. For example, the surrounding environment information may include information on attributes of the object present outside the vehicle 1 and information on a distance or a position of the object with respect to the vehicle 1. The external camera 6A may be configured as a monocular camera or a stereo camera.

The internal camera 6B is disposed inside the vehicle 1 and is configured to acquire image data indicating the occupant H. The internal camera 6B functions as a tracking camera for tracking the viewpoint E of the occupant H. Here, the viewpoint E of the occupant H may be either a viewpoint of a left eye or a viewpoint of a right eye of the occupant H. Alternatively, the viewpoint E may be defined as a middle point of a line segment connecting the viewpoint of the left eye and the viewpoint of the right eye. The display control unit 43 may specify a position of the viewpoint E of the occupant H based on the image data acquired by the internal camera 6B. The position of the viewpoint E of the occupant H may be updated at a predetermined cycle based on the image data, or may be determined only once when the vehicle 1 is started.

The radar 7 includes at least one of a millimeter wave radar, a microwave radar and a laser radar (for example, a LiDAR unit). For example, the LiDAR unit is configured to detect the surrounding environment of the vehicle 1. In particular, the LiDAR unit is configured to acquire 3D mapping data (point cloud data) indicating the surrounding environment of the vehicle 1 and then transmit the 3D mapping data to the vehicle control unit 3. The vehicle control unit 3 specifies the surrounding environment information based on the transmitted 3D mapping data.

The HMI 8 includes an input unit that receives an input operation from the driver, and an output unit that outputs the traveling information or the like to the driver. The input unit includes a steering wheel, an accelerator pedal, a brake pedal, a driving mode switching switch that switches a driving mode of the vehicle 1, and the like. The output unit is a display (excluding a HUD) that displays various types of travel information. The GPS 9 is configured to acquire current position information of the vehicle 1 and output the acquired current position information to the vehicle control unit 3.

The wireless communication unit 10 is configured to receive information on other vehicles around the vehicle 1 (for example, traveling information) from other vehicles and transmit information (for example, the traveling information) on the vehicle 1 to other vehicles (inter-vehicle communication). The wireless communication unit 10 is configured to receive infrastructure information from infrastructure equipment such as a traffic light or a sign lamp and transmit the traveling information on the vehicle 1 to the infrastructure equipment (road-vehicle communication). The wireless communication unit 10 is configured to receive information on a pedestrian from a portable electronic device (a smart phone, a tablet, a wearable device or the like) carried by the pedestrian and transmit the own vehicle traveling information on the vehicle 1 to the portable electronic device (pedestrian-vehicle communication). The vehicle 1 may directly communicate with other vehicles, the infrastructure equipment or the portable electronic device in an ad-hoc mode, or via an access point. The vehicle 1 may communicate with other vehicles, the infrastructure equipment or the portable electronic device via a communication network (not shown). The communication network includes at least one of the Internet, a local area network (LAN), a wide area network (WAN) and a radio access network (RAN). A wireless communication standard is, for example, Wi-Fi (registered trademark). Bluetooth (registered trademark), ZigBee (registered trademark), IPWA, DSRC (registered trademark) or Li-Fi. The vehicle 1 may communicate with other vehicles, the infrastructure equipment or the portable electronic device using a fifth generation mobile communication system (5G).

The storage device 11 is an external storage device such as a hard disk drive (HDD) or a solid state drive (SSD). The storage device 11 may store two-dimensional or three-dimensional map information and/or a vehicle control program. For example, the three-dimensional map information may include 3D mapping data (point cloud data). The storage device 11 is configured to output the map information and the vehicle control program to the vehicle control unit 3 in response to a request from the vehicle control unit 3. The map information and the vehicle control program may be updated via the wireless communication unit 10 and the communication network.

When the vehicle 1 travels in the automated driving mode, the vehicle control unit 3 automatically generates at least one of a steering control signal, an accelerator control signal and a brake control signal based on the traveling state information, the surrounding environment information, the current position information, the map information and the like. The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal. In this way, the vehicle control unit 3 automatically controls the traveling of the vehicle 1 based on the traveling state information, the surrounding environment information, the current position information, the map information and the like. That is, in the automated driving mode, the traveling of the vehicle 1 is automatically controlled by the vehicle system 2.

In contrast, when the vehicle 1 travels in a manual driving mode, the vehicle control unit 3 generates the steering control signal, the accelerator control signal and the brake control signal according to a manual operation of the driver on the accelerator pedal, the brake pedal and the steering wheel. In this way, in the manual driving mode, since the steering control signal, the accelerator control signal and the brake control signal are generated by the manual operation of the driver, the traveling of the vehicle 1 is controlled by the driver.

Next, the driving mode of the vehicle 1 will be described. The driving mode includes the automated driving mode and the manual driving mode. The automated driving mode includes a fully automated driving mode, an advanced driving support mode and a driving support mode. In the fully automated driving mode, the vehicle system 2 automatically performs all traveling controls including the steering control, the brake control and the accelerator control, and the driver cannot drive the vehicle 1. In the advanced driving support mode, the vehicle system 2 automatically performs all the traveling controls including the steering control, the brake control and the accelerator control, and the driver can drive the vehicle 1 but does not drive the vehicle 1. In the driving support mode, the vehicle system 2 automatically performs a part of the traveling controls including the steering control, the brake control and the accelerator control, and the driver drives the vehicle 1 under driving support of the vehicle system 2. In contrast, in the manual driving mode, the vehicle system 2 does not automatically perform the traveling controls, and the driver drives the vehicle 1 without the driving support of the vehicle system 2.

The driving mode of the vehicle 1 may be switched by operating the driving mode switching switch. In this case, the vehicle control unit 3 switches the driving mode of the vehicle 1 among four driving modes (the fully automated driving mode, the advanced driving support mode, the driving support mode and the manual driving mode) according to an operation of the driver on the driving mode switching switch. The driving mode of the vehicle 1 may be automatically switched based on information on a travelable section where the automated driving vehicle may travel or a traveling-prohibited section where traveling of the automated driving vehicle is prohibited, or information on the external weather condition. In this case, the vehicle control unit 3 switches the driving mode of the vehicle 1 based on these pieces of information. The driving mode of the vehicle 1 may be automatically switched by using the seating sensor, the face orientation sensor or the like. In this case, the vehicle control unit 3 switches the driving mode of the vehicle 1 based on a signal output from the seating sensor or the face orientation sensor.

Figure 4:
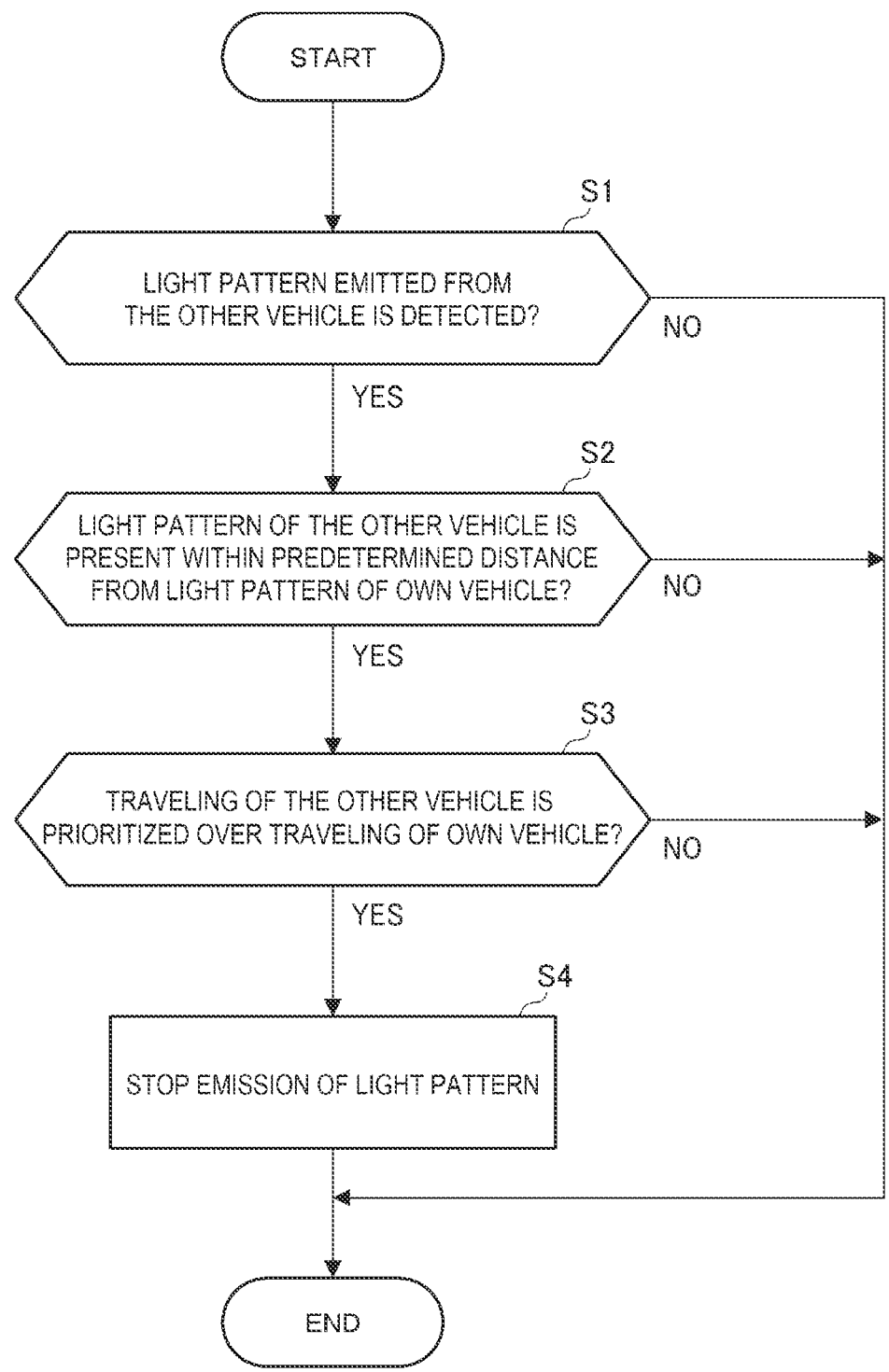
FIG. 4 is a flowchart for explaining a first operation example of a display system according to the present embodiment.
Figure 5:
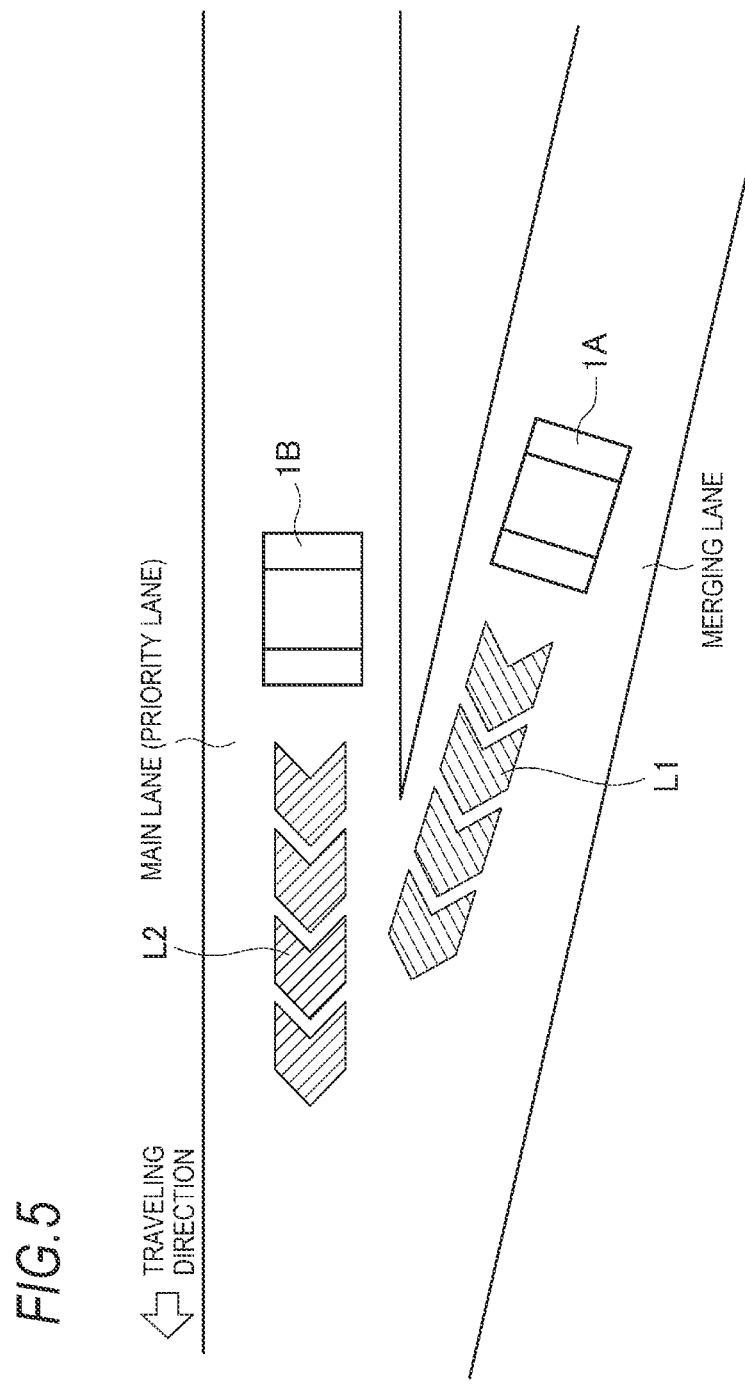
FIG. 5 is a view showing a state in which a light pattern emitted from a vehicle traveling on a main lane is present within a predetermined distance from a light pattern emitted from a vehicle traveling on a merging lane.
Figure 6:
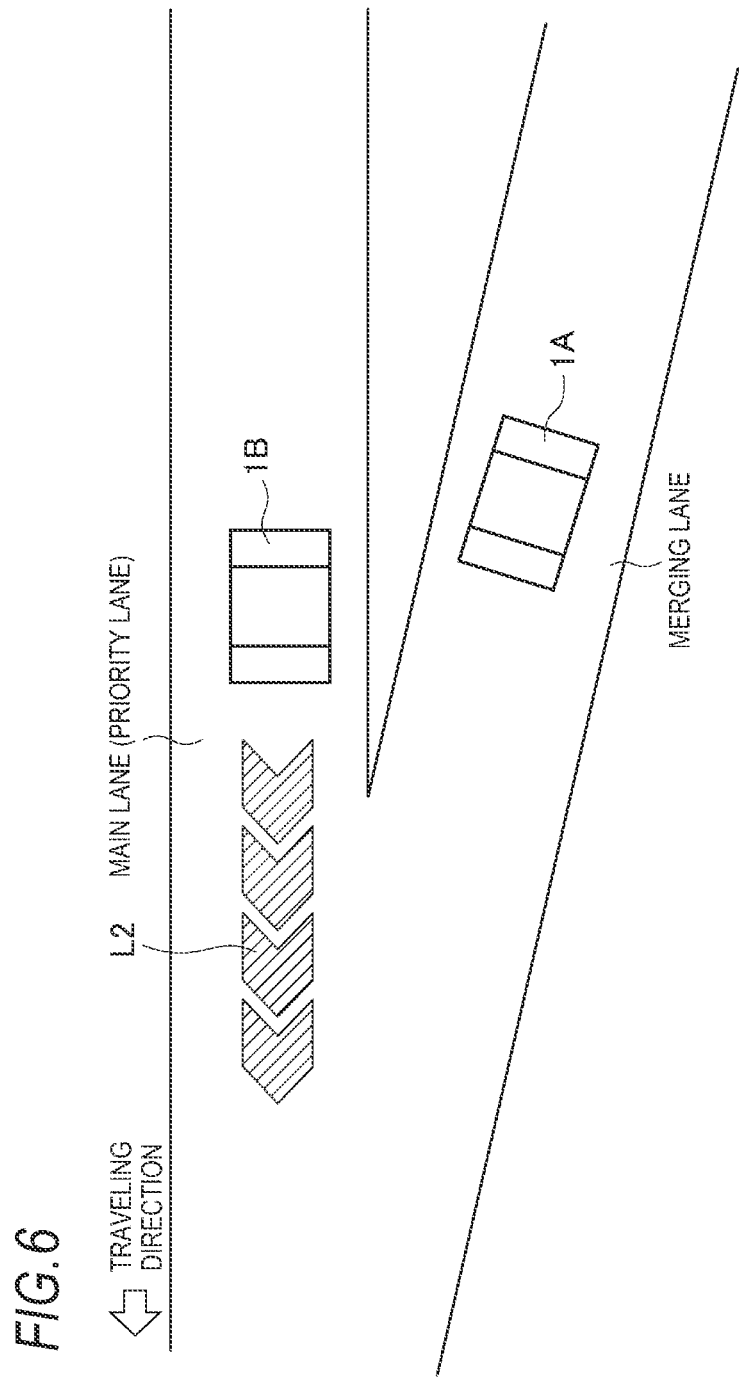
FIG. 6 is a view showing a state in which the vehicle traveling on the merging lane has stopped emission of the light pattern.

Next, a first operation example of the display system 4 according to the present embodiment will be described below with reference mainly to FIGS. 4 to 6. FIG. 4 is a flowchart for explaining the first operation example of the display system 4. FIG. 5 is a view showing a state in which a light pattern L2 (an example of a second light pattern) emitted from a vehicle 1B, which is the other vehicle traveling on a main lane, is present within a predetermined distance from a light pattern L1 (an example of a first light pattern) emitted from a vehicle 1A, which is an own vehicle traveling on a merging lane. FIG. 6 is a view showing a state in which the vehicle 1A traveling on the merging lane has stopped emission of the light pattern L1.

In the description of the present embodiment, it is assumed that the vehicles 1A, 1B have the same configuration as that of the vehicle 1 described above. That is, it is assumed that the vehicles 1A, 1B include the vehicle system 2 shown in FIG. 2. In this respect, the road surface drawing device 45 of the vehicle 1A emits the light pattern L1 indicating a traveling direction of the vehicle 1A onto a road surface, and the road surface drawing device 45 of the vehicle 1B emits the light pattern L2 indicating a traveling direction of the vehicle 1B onto a road surface.

First, as shown in FIG. 4, when the display control unit 43 of the vehicle 1A, which is the own vehicle, detects a light pattern emitted from the other vehicle based on image data acquired from the external camera 6A (YES in step S1), the display control unit 43 executes determination processing of step S2. On the other hand, when no light pattern of the other vehicle is detected (NO in step S1), the processing ends. In this example, as shown in FIG. 5, the display control unit 43 of the vehicle 1A detects the light pattern L2 emitted from the road surface drawing device 45 of the vehicle 1B based on the image data acquired from the external camera 6A.

Next, based on the acquired image data, the display control unit 43 of the vehicle 1A determines whether the light pattern L2 emitted from the vehicle 1B is present within a predetermined distance from the light pattern L1 emitted from the vehicle 1A (step S2). Here, the "predetermined distance" may be appropriately changed according to the surrounding environment of the vehicle 1. Information on the predetermined distance may be stored in the memory of the display control unit 43. Specifically, the display control unit 43 may specify position information of the light patterns L1, L2 based on the image data, and then determine whether the light pattern L2 is present within the predetermined distance from the light pattern L1. Since the display control unit 43 determines an emission position of the light pattern L1, the position information of the light pattern L1 may not be specified based on the image data. In this case, the display control unit 43 may specify only the position information of the light pattern L2 based on the image data. When a determination result of step S2 is YES, the processing proceeds to step S3. On the other hand, when the determination result of step S2 is NO, the processing ends. In this example, the display control unit 43 determines that the light pattern L2 is present within the predetermined distance from the light pattern LL.

Next, the display control unit 43 acquires map information from the storage device 11 and acquires current position information of the vehicle 1A from the GPS 9. After that, the display control unit 43 specifies the lane on which the vehicle 1A is traveling and the lane on which the vehicle 1B is traveling based on the map information and the current position information. After that, the display control unit 43 determines whether traveling of the vehicle 1B is prioritized over traveling of the vehicle 1A (step S3). As shown in FIG. 5, since the vehicle 1A is traveling on the merging lane, while the vehicle 1B is traveling on the main lane as a priority lane, the display control unit 43 determines that the traveling of the vehicle 1B is prioritized over the traveling of the vehicle 1A (YES in step S3). When a determination result of step S3 is YES, the processing proceeds to step S4. On the other hand, when the determination result of step S3 is NO, the processing ends.

Next, in step S4, the display control unit 43 stops the emission of the light pattern L1 (see FIG. 6). Specifically, the display control unit 43 stops the emission of the light pattern L1 by stopping driving of the road surface drawing device 45.

According to the first operation example of the display system 4, when the detected light pattern L2 is present within the predetermined distance from the light pattern L1, and the traveling of the vehicle 1B is prioritized over the traveling of the vehicle 1A, the emission of the light pattern L1 is stopped. In this way, it is possible to suitably prevent a situation in which an occupant of the vehicle 1A and/or a pedestrian or the like present around the vehicle 1A may not clearly view the light pattern L2 of the vehicle 1B whose traveling is prioritized over that of the vehicle 1A. Therefore, it is possible to provide the display system 4 capable of preventing a decrease in visibility to the light pattern L2.

In the first operation example of the display system 4, when all conditions set in steps S1 to S3 are satisfied, the emission of the light pattern L1 is stopped, but the present embodiment is not limited thereto. For example, when the condition of step S1 is satisfied, the emission of the light pattern L1 may be stopped. In addition, when the conditions of steps S1 and S2 are satisfied, the emission of the light pattern L1 may be stopped. Further, when the conditions of steps S1 and S3 are satisfied, the emission of the light pattern L1 may be stopped.

Figure 7:
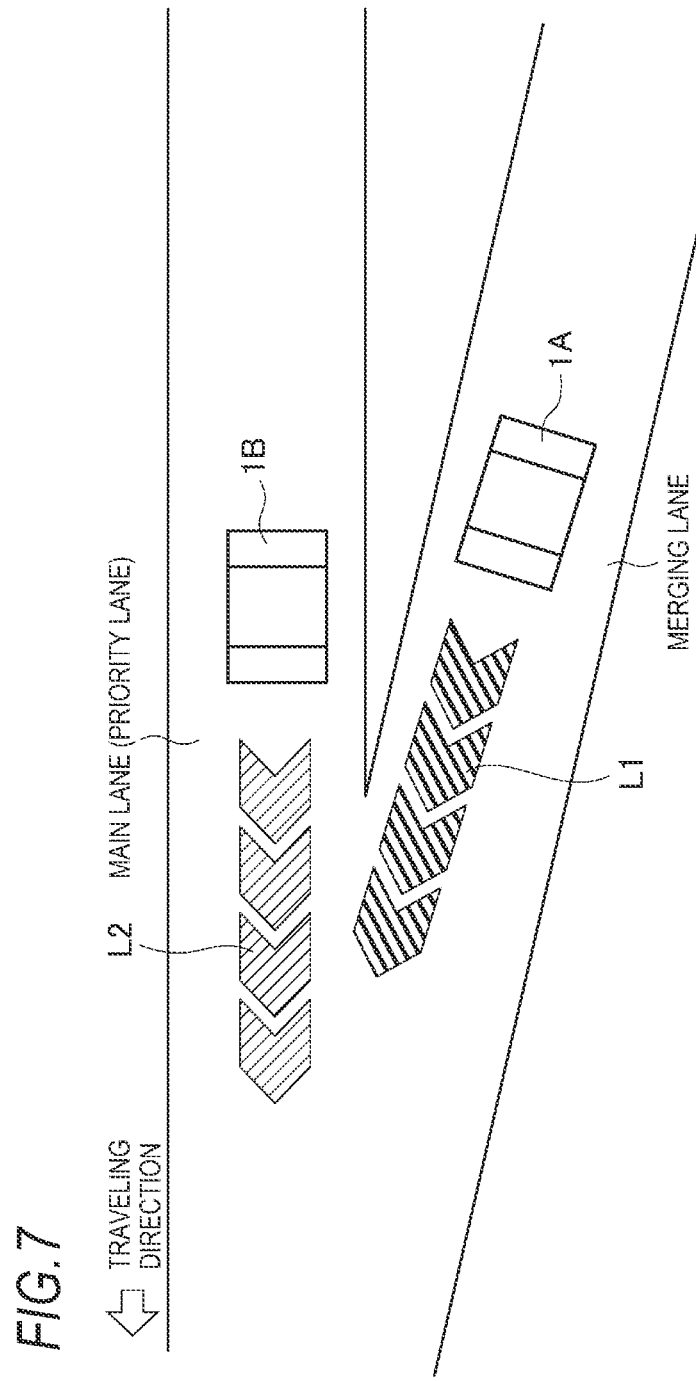
FIG. 7 is a view showing a state in which the vehicle traveling on the merging lane has changed a display color of the light pattern.

In step S4, the display control unit 43 stops the emission of the light pattern L1, but the present embodiment is not limited thereto. For example, instead of stopping the emission of the light pattern L1, the display control unit 43 may change a visual mode (for example, a display color, a blinking cycle, an illumination intensity and an illumination area) of the light pattern L1. For example, as shown in FIG. 7, the display control unit 43 may change the display color of the light pattern L1 in step S4.

In step S2, the display control unit 43 determines whether the light pattern L2 is present within the predetermined distance from the light pattern L1, but the present embodiment is not limited thereto. For example, in step S2, the display control unit 43 may determine whether the light pattern L2 is present within a predetermined distance from the vehicle 1A.

In step S4, the display control unit 43 may stop the emission of the light pattern L1 onto the road surface, while causing the HUD 42 to display information indicated by the light pattern L1 as HUD information. Specifically, information on the traveling direction of the vehicle 1A may be displayed as the HUD information in the HUD display area D1 (see FIG. 10). In this case, the occupant of the vehicle 1A can clearly grasp an intention of the vehicle 1A by viewing the information indicated by the light pattern L1 through the HUD 42.

In step S4, the display control unit 43 may stop emission of a part of the light pattern L1. For example, a length and an area of the light pattern L1 radiated onto the road surface may be reduced.

Figure 8:
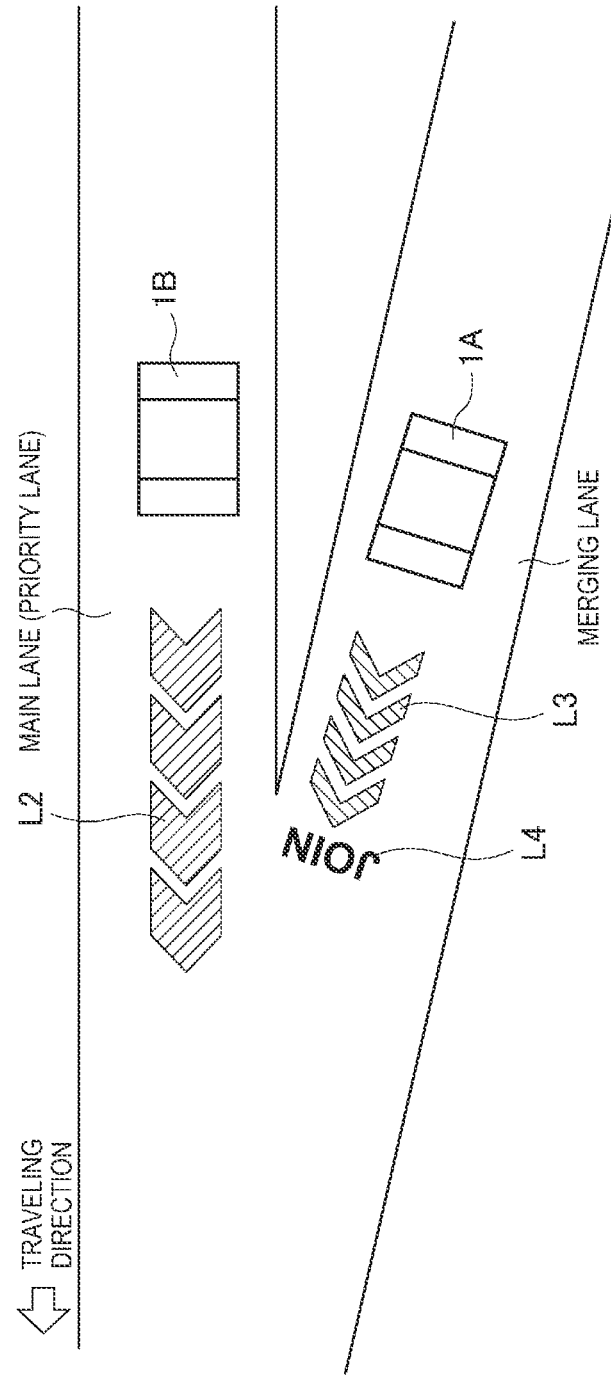
FIG. 8 is a view showing a state in which the vehicle traveling on the merging lane emits a light pattern indicating character information and a light pattern indicating a traveling direction of the vehicle.
Figure 9:
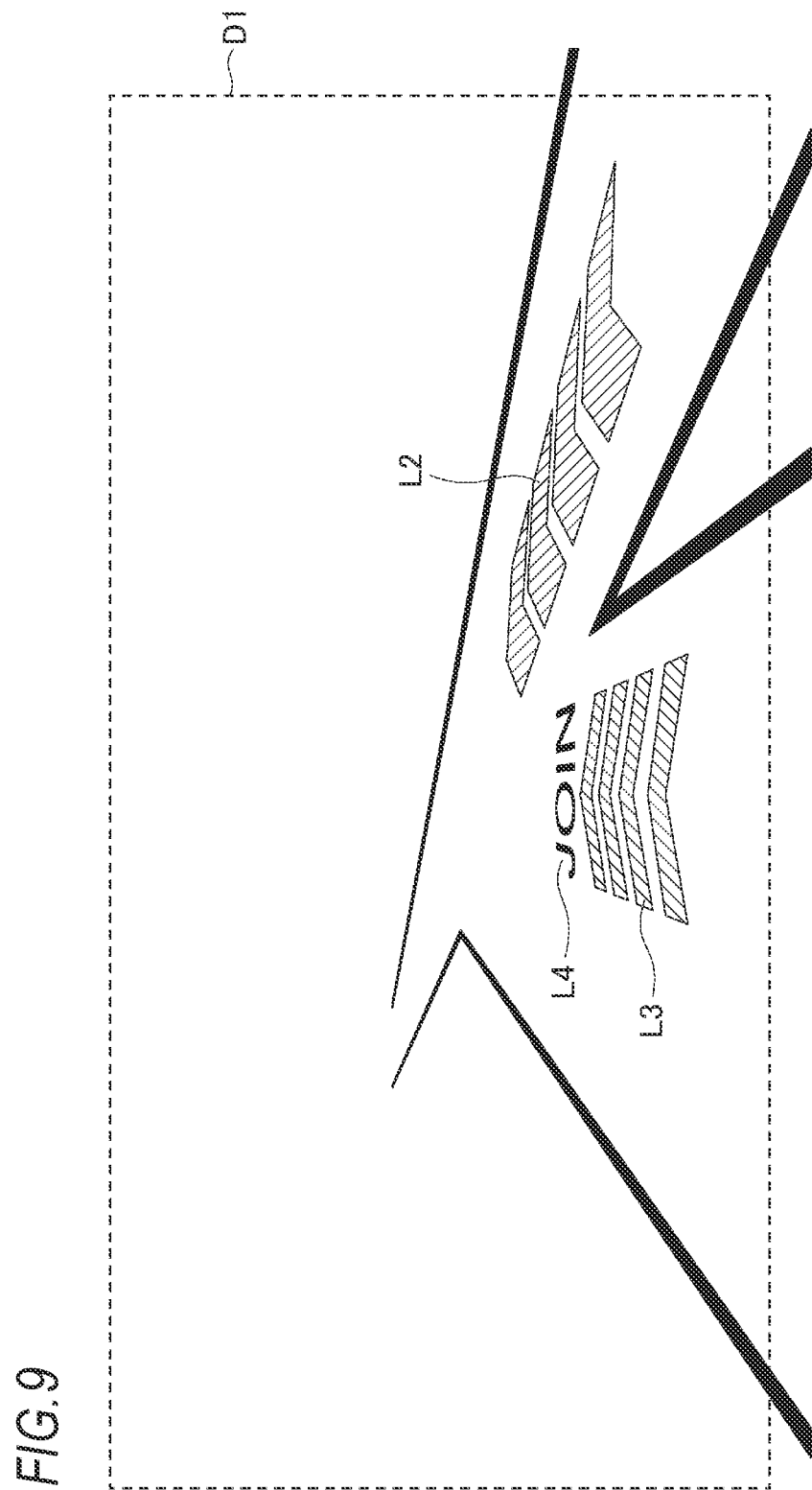
FIG. 9 is a view showing the three light patterns viewed from an occupant of the vehicle traveling on the merging lane.
Figure 10:
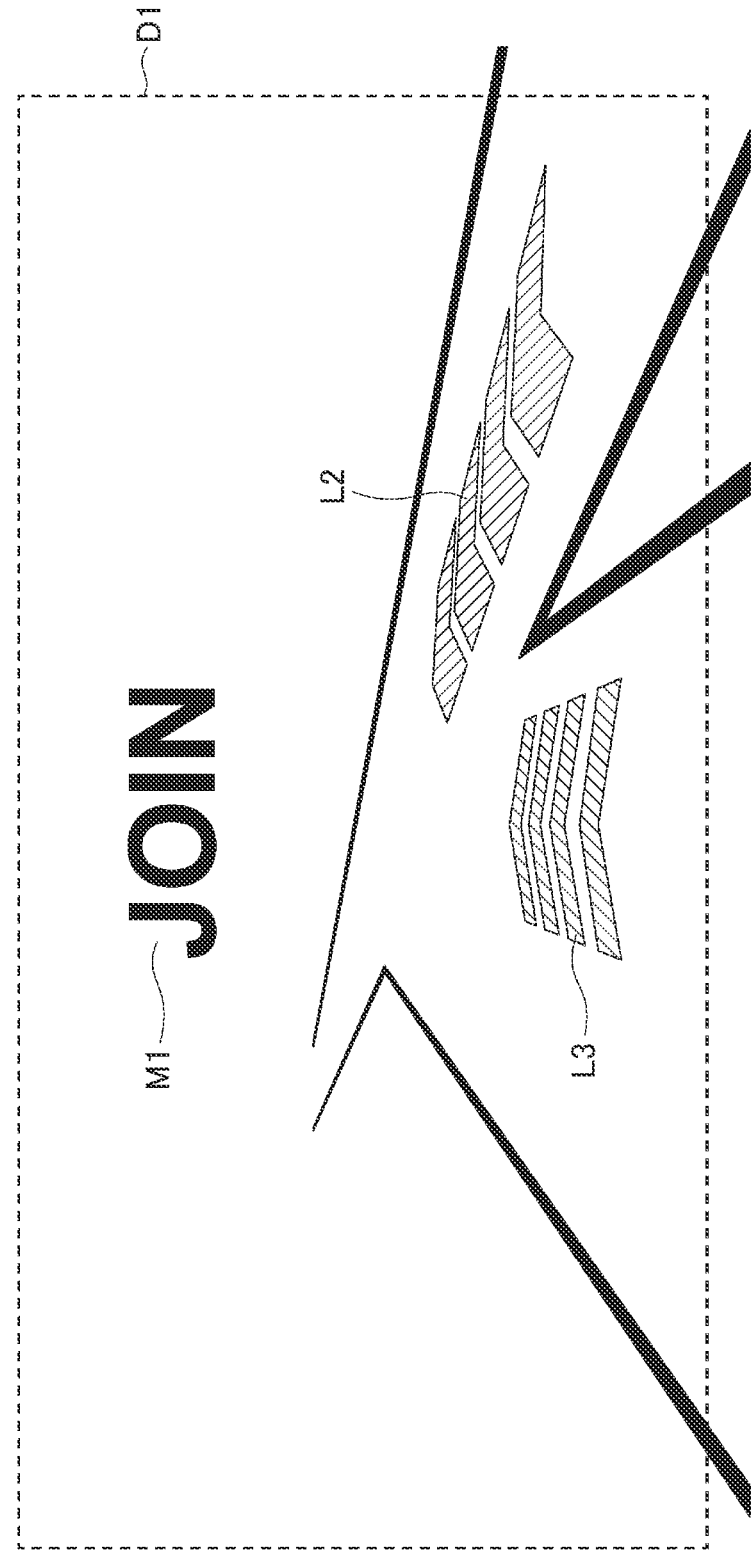
FIG. 10 is a view showing a state in which the character information indicated by the light pattern is displayed in a HUD display area.

As shown in FIGS. 8 and 9, it is assumed that the vehicle 1A emits a light pattern L3 indicating the traveling direction of the vehicle 1A and a light pattern L4 indicating character information onto the road surface. FIG. 8 is a view showing a state in which the vehicle 1A emits the light pattern L4 indicating the character information and the light pattern L3 indicating the traveling direction of the vehicle 1A. FIG. 9 is a view showing the three light patterns L2, L3 and L4 viewed from the occupant of the vehicle 1A. In this case, as shown in FIG. 10, the display control unit 43 of the vehicle 1A may stop emission of the light pattern L4 indicating the character information, while maintaining emission of the light pattern L3 indicating graphic information. Further, the display control unit 43 may display information indicated by the light pattern L3 in the HUD display area D1 as HUD information M1 ("JOIN"). In this case, while the emission of the light pattern L3 is stopped, the occupant of the vehicle 1A can clearly grasp the intention of the vehicle 1A joining the main lane by viewing the HUD information M1 through the HUD 42.

Figure 11:
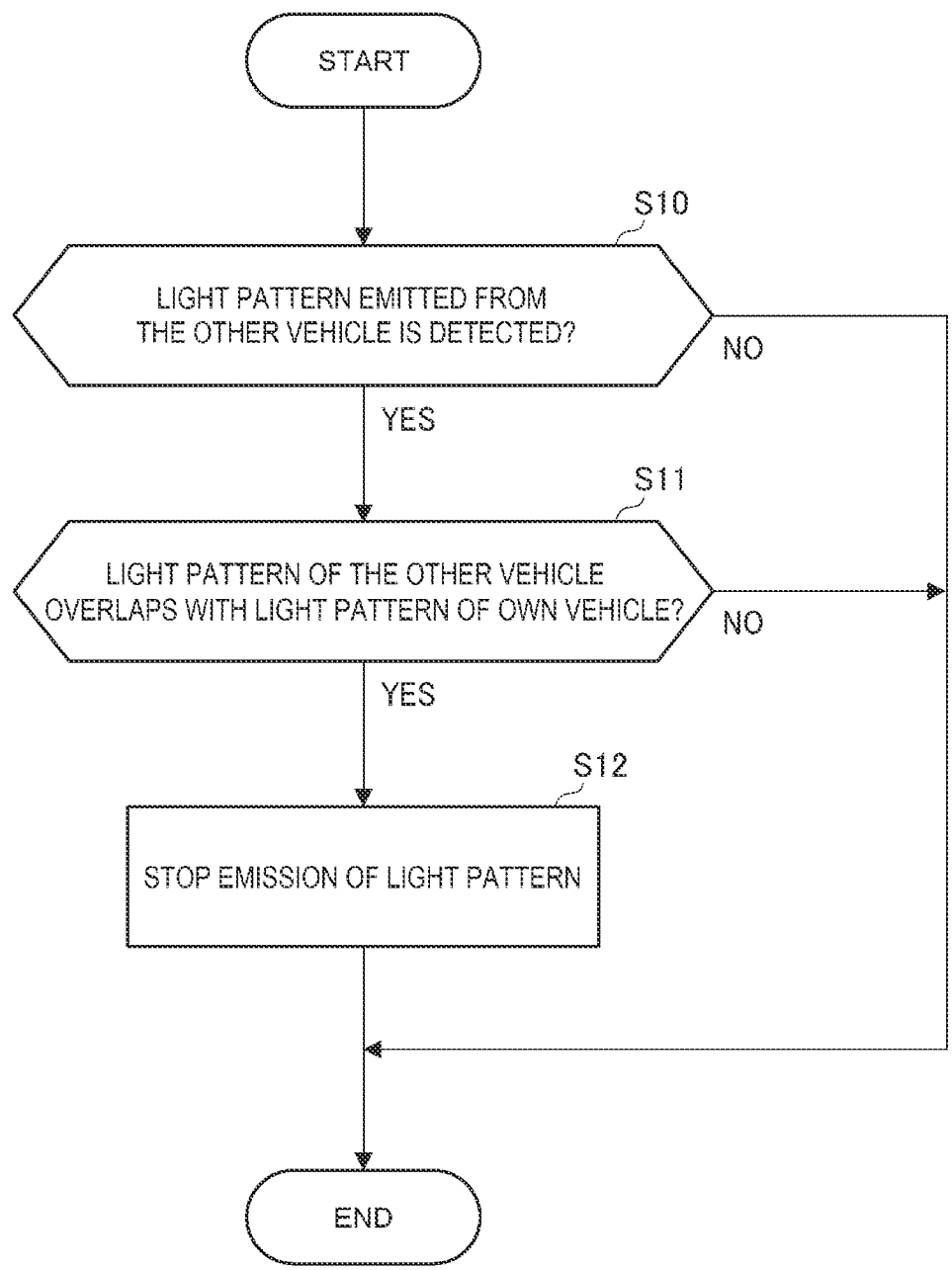
FIG. 11 is a flowchart for explaining a second operation example of the display system according to the present embodiment.
Figure 12:
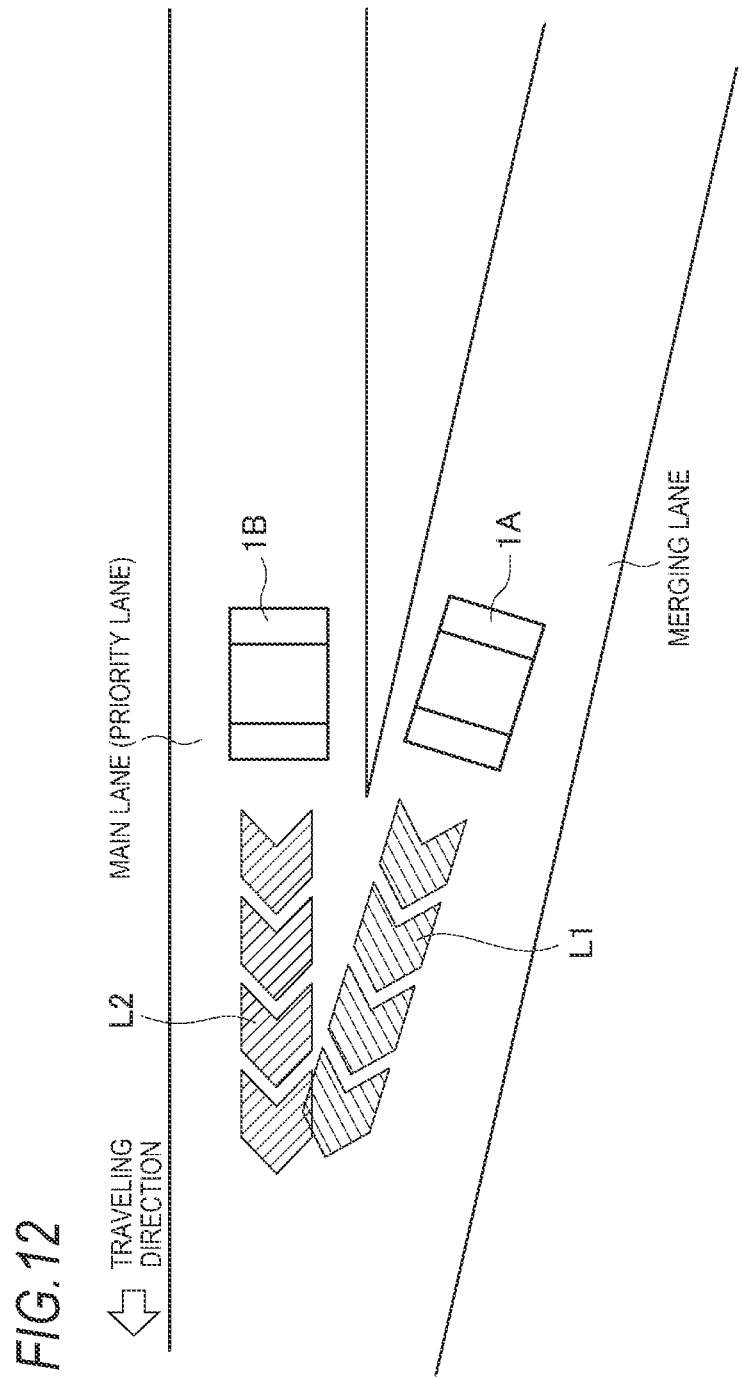
FIG. 12 is a view showing a state in which the light pattern emitted from the vehicle traveling on the main lane and the light pattern emitted from the vehicle traveling on the merging lane partially overlap with each other.
Figure 13:
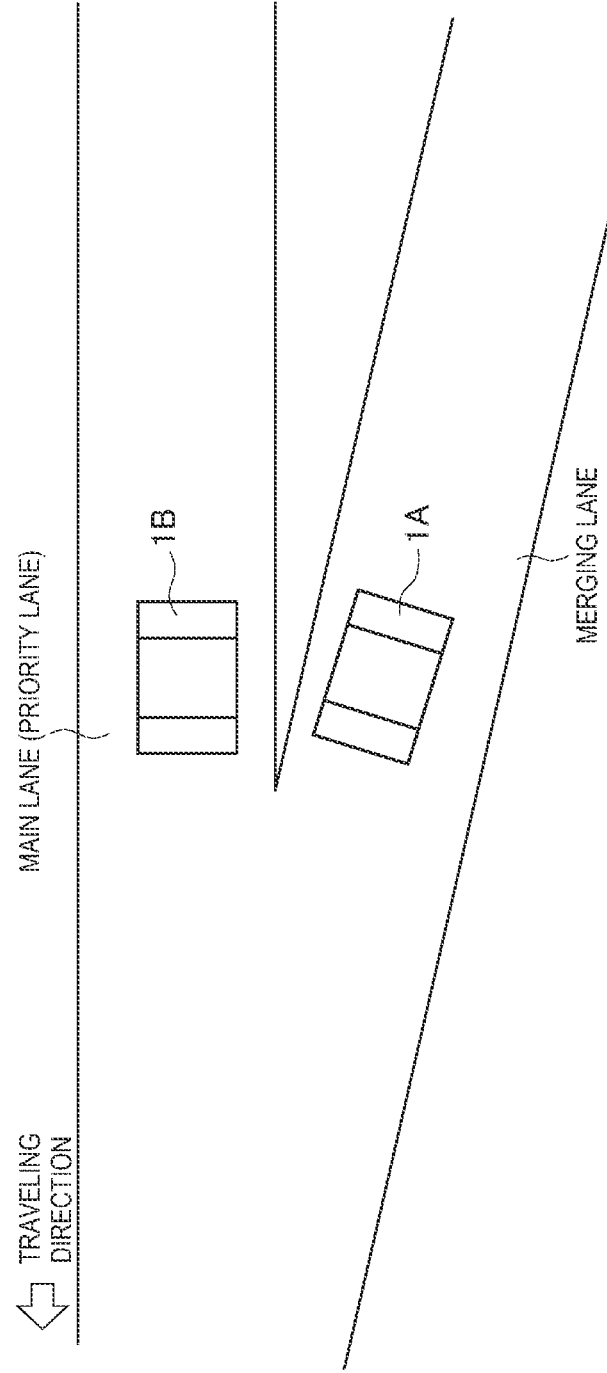
FIG. 13 is a view showing a state in which the vehicle traveling on the merging lane has stopped emission of the light pattern, and the vehicle traveling on the main lane has stopped emission of the light pattern.

Next, a second operation example of the display system 4 according to the present embodiment will be described below with reference to FIGS. 11 to 13. FIG. 11 is a flowchart for explaining the second operation example of the display system 4. FIG. 12 is a view showing a state in which the light pattern L2 emitted from the vehicle 1B traveling on the main lane and the light pattern L1 emitted from the vehicle 1A traveling on the merging lane partially overlap with each other. FIG. 13 is a view showing a state in which the vehicle 1A traveling on the merging lane has stopped emission of the light pattern L1, and the vehicle 1B traveling on the main lane has stopped emission of the light pattern L2.

First, as shown in FIG. 11, when the display control unit 43 of the vehicle 1A detects a light pattern emitted from the other vehicle based on the image data acquired from the external camera 6A (YES in step S10), the display control unit 43 executes determination processing of step S11. On the other hand, when no light pattern of the other vehicle is detected (NO in step S10), the processing ends. In this example, as shown in FIG. 12, the display control unit 43 of the vehicle 1A detects the light pattern L2 emitted from the road surface drawing device 45 of the vehicle 1B based on the image data acquired from the external camera 6A.

Next, the display control unit 43 of the vehicle 1A determines whether the light pattern L2 of the vehicle 1B overlaps with the light pattern L1 of the vehicle 1A (step S11). Here, a state in which the light pattern L2 overlaps with the light pattern L1 means a state in which the light pattern L2 overlaps with the light pattern L1 at least partially. Specifically, the display control unit 43 may determine whether the light pattern L2 overlaps with the light pattern L1 based on the image data. When a determination result of step S11 is YES, the processing proceeds to step S12. On the other hand, when the determination result of step S11 is NO, the processing ends. In this example, as shown in FIG. 12, the display control unit 43 determines that the light pattern L2 overlaps with the light pattern L1.

Next, in step S12, the display control unit 43 of the vehicle 1A stops the emission of the light pattern L1. Specifically, the display control unit 43 stops the emission of the light pattern L1 by stopping driving of the road surface drawing device 45. Similarly, the display control unit 43 of the vehicle 1B stops the emission of the light pattern L2. In this example, since it is not considered whether the lane on which the vehicle is traveling is the priority lane, both of the vehicles 1A, 1B stop the emission of the light patterns as shown in FIG. 13.

In step S12, the display control unit 43 stops the emission of the light pattern L1, but the present embodiment is not limited thereto. For example, instead of stopping the emission of the light pattern L1, the display control unit 43 may change a visual mode (for example, a display color, a blinking cycle, an illumination intensity and an illumination area) of the light pattern L1. In step S12, the display control unit 43 may stop the emission of the light pattern L1 onto the road surface, while causing the HUD 42 to display information indicated by the light pattern L1 as HUD information. Further, the display control unit 43 may stop emission of a part of the light pattern L1.

Next, a third operation example of the display system 4 according to the present embodiment will be described below with reference to FIGS. 12 and 14. FIG. 14 is a flowchart for explaining the third operation example of the display system 4. Since the processing of steps S20, S21 shown in FIG. 14 are the same as the processing of steps S10, S11 shown in FIG. 11, description of the processing of steps S20, S21 will be omitted.

As shown in FIG. 14, after executing the processing of steps S20, S21, the display control unit 43 of the vehicle 1A determines whether traveling of the vehicle 1B is prioritized over traveling of the vehicle 1A (step S22). As shown in FIG. 12, since the vehicle 1A is traveling on the merging lane, while the vehicle 1B is traveling on the main lane as the priority lane, the display control unit 43 determines that the traveling of the vehicle 1B is prioritized over the traveling of the vehicle 1A (YES in step S22). Next, in step S23, the display control unit 43 stops emission of the light pattern L1.

According to the third operation example of the display system 4, when the light pattern L2 overlaps with the light pattern L1 and the traveling of the vehicle 1B is prioritized over the traveling of the vehicle 1A, the emission of the light pattern L1 is stopped. In this way, it is possible to suitably prevent a situation in which the occupant of the vehicle 1A and/or the pedestrian or the like may not clearly view the light pattern L2 of the vehicle 1B traveling on the priority lane. Therefore, it is possible to provide the display system 4 capable of preventing a decrease in visibility to the light pattern L2.

In step S23, the display control unit 43 stops the emission of the light pattern L1, but the present embodiment is not limited thereto. For example, instead of stopping the emission of the light pattern L1, the display control unit 43 may change a visual mode (for example, a display color, a blinking cycle, an illumination intensity and an illumination area) of the light pattern L1. In step S23, the display control unit 43 may stop the emission of the light pattern L1 onto the road surface, while causing the HUD 42 to display information indicated by the light pattern L1 as HUD information. Further, the display control unit 43 may stop emission of a part of the light pattern L1.

Although the embodiment of the present invention has been described above, it is needless to say that the technical scope of the present invention should not be limitedly interpreted by the description of the embodiment. It is to be understood by those skilled in the art that the present embodiment is merely an example and various modifications can be made within the scope of the invention described in the claims. The technical scope of the present invention should be determined based on the scope of the invention described in the claims and the scope of equivalents thereof.

In the present embodiment, a driving mode of the vehicle is described as including the fully automated driving mode, the advanced driving support mode, the driving support mode and the manual driving mode, but the driving mode of the vehicle should not be limited to these four modes. Classification of the driving mode of the vehicle may be appropriately changed according to laws or regulations related to automated driving in each country. Similarly, definitions of the "fully automated driving mode", the "advanced driving support mode" and the "driving support mode" in the description of the present embodiment are merely examples and may be appropriately changed according to the laws or regulations related to the automated driving in each country.

The present application appropriately incorporates the contents disclosed in Japanese Patent Application (Japanese Patent Application No. 2018-147735) filed on Aug. 6, 2018.

The invention claimed is:

1. A vehicle display system provided in a vehicle, the vehicle display system comprising:
   a first display device configured to emit a first light pattern toward a road surface outside the vehicle;
   a second display device located inside the vehicle; and
   a display control unit configured to control the first display device,
   wherein in response to detection of a second light pattern emitted from another vehicle present around the vehicle toward a road surface outside the another vehicle, the display control unit stops emission of at least a part of the first light pattern and causes the second display device to display information indicated by at least the part of the first light pattern.

2. The vehicle display system according to claim 1, wherein when the detected second light pattern is present within a predetermined distance from the vehicle or the first light pattern, the display control unit stops the emission of at least the part of the first light pattern.

3. The vehicle display system according to claim 1, wherein when the detected second light pattern overlaps with the first light pattern, the display control unit stops the emission of at least the part of the first light pattern.

4. The vehicle display system according to claim 1, wherein when traveling of the another vehicle is prioritized over traveling of the vehicle, the display control unit stops the emission of at least the part of the first light pattern.

5. The vehicle display system according to claim 1, wherein the second display device is configured to display predetermined information toward an occupant of the vehicle such that the predetermined information is superimposed on a real space outside the vehicle.

6. The vehicle display system according to claim 5, wherein the first light pattern indicates character information or traveling direction of the vehicle.

7. A vehicle comprising:
   the vehicle display system according to claim 1.

8. The vehicle display system according to claim 1, wherein the second display device functions as a visual interface between the vehicle and the occupant.

* * * * *